United States Patent
Ting

(10) Patent No.: US 7,753,694 B2
(45) Date of Patent: Jul. 13, 2010

(54) STACKED CARD CONNECTOR

(75) Inventor: Chien-Jen Ting, Tu-cheng (TW)

(73) Assignee: Hon Hai Precision Ind. Co., Ltd., Taipei Hsien (TW)

( * ) Notice: Subject to any disclaimer, the term of this patent is extended or adjusted under 35 U.S.C. 154(b) by 0 days.

(21) Appl. No.: 12/228,563

(22) Filed: Aug. 13, 2008

(65) Prior Publication Data

US 2009/0047834 A1 Feb. 19, 2009

(30) Foreign Application Priority Data

Aug. 14, 2007 (TW) .............................. 96213363 U

(51) Int. Cl.
*H01R 12/00* (2006.01)
(52) U.S. Cl. ...................... 439/79; 439/541.5; 439/630
(58) Field of Classification Search ............. 439/541.5, 439/630, 79
See application file for complete search history.

(56) References Cited

U.S. PATENT DOCUMENTS

| | | | |
|---|---|---|---|
| 5,688,130 A * | 11/1997 | Huang | 439/79 |
| 6,238,240 B1 | 5/2001 | Yu | |
| 6,338,631 B1 * | 1/2002 | Hashimoto et al. | 439/79 |
| 6,390,832 B1 * | 5/2002 | Kuo | 439/101 |
| 6,634,905 B2 * | 10/2003 | Kuo | 439/541.5 |
| 6,736,671 B2 * | 5/2004 | Lee | 439/541.5 |
| 6,929,513 B2 * | 8/2005 | Fan | 439/630 |
| 7,063,539 B2 | 6/2006 | Ho | |
| 7,086,906 B1 | 8/2006 | Ting | |

* cited by examiner

*Primary Examiner*—Truc T Nguyen
(74) *Attorney, Agent, or Firm*—Andrew C. Cheng; Wei Te Chung; Ming Chieh Chang

(57) ABSTRACT

A stacked card connector (100) adaptor for receiving cards includes a first electrical card connector (1), a second electrical card connector (2) under the first electrical card connector and a retaining member (4) integral with the second insulating housing. The first card connector includes a first insulating housing (12) received a plurality of first terminals (13). The second card connector includes a second insulating housing (22) received a plurality of second terminals (23). The retaining member defines a plurality of slots (41), said first and second terminals partially passing through the slots.

7 Claims, 6 Drawing Sheets

US 7,753,694 B2

STACKED CARD CONNECTOR

BACKGROUND OF THE INVENTION

1. Field of the Invention

The present invention relates to a card connector to be used in a personal computer or the like for connecting and disconnecting a card to the personal computer. Here, the card generally refers to a memory card such as personal computer (PC) card or the like.

2. Description of Prior Arts

Modern times, the PC card is always used as an external equipment for increase the storage of the electrical consumer products, like Mobile phone, Digital camera, etc. The electrical card connector is used for electrically connecting the PC card and the electrical consumer products. Specially, a card connector is disclosed by the prior art, which comprises a plurality of card connectors stacked with each other to save the space of the electrical products. Meantime, for improving the quality of signals transmitting, some of stacked card connector use an electrical converting plate to electrical connect with a printed circuit board (PCB).

The prior arts discloses a stacked card connector comprising a first card connector, a second card connector stacked with the first card connector and a converting plate assembled on the second card connector. However, this kind of converting plate is separated with the card connector, during assembly, we need to increase assembling step to mounted the converting plate.

Therefore, we need an improved stacked card connector to solve these problems.

SUMMARY OF THE INVENTION

An object, therefore, of the invention is to provide a stacked card connector, which is easily mating with a converting plate.

In the exemplary embodiment of the invention, a stacked card connector adaptor for receiving cards includes a first electrical card connector, a second electrical card connector under the first electrical card connector and a retaining member integral with the second insulating housing. The first card connector includes a first insulating housing received a plurality of first terminals. The second card connector includes a second insulating housing received a plurality of second terminals. The retaining member defines a plurality of slots, said first and second terminals partially passing through the slots.

Other objects, advantages and novel features of the invention will become more apparent from the following detailed description of the present embodiment when taken in conjunction with the accompanying drawings.

DETAILED DESCRIPTION OF THE PREFERRED EMBODIMENT

An embodiment of the present invention will be described with reference to FIG. 1 through FIG. 6.

Figure 1:
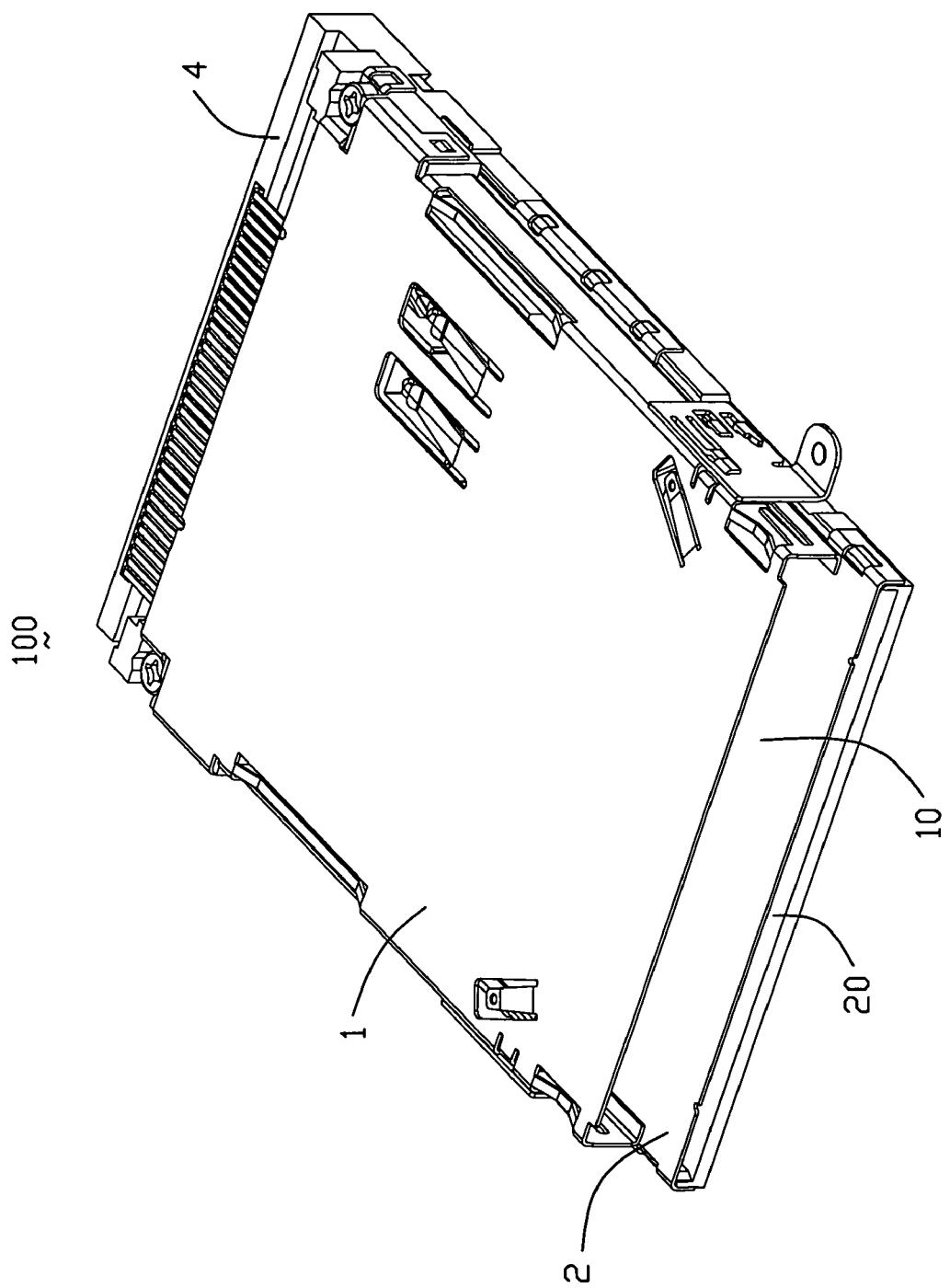
FIG. 1 is a perspective view of a stacked card connector of present invention.

In FIG. 1, a stacked card connector 100 of present invention comprises a first connector 1, a second connector 2 mounted under the first connector 1, a converting plate 3 mating with the first and the second connector 1, 2 and a retaining member 4.

Figure 2:
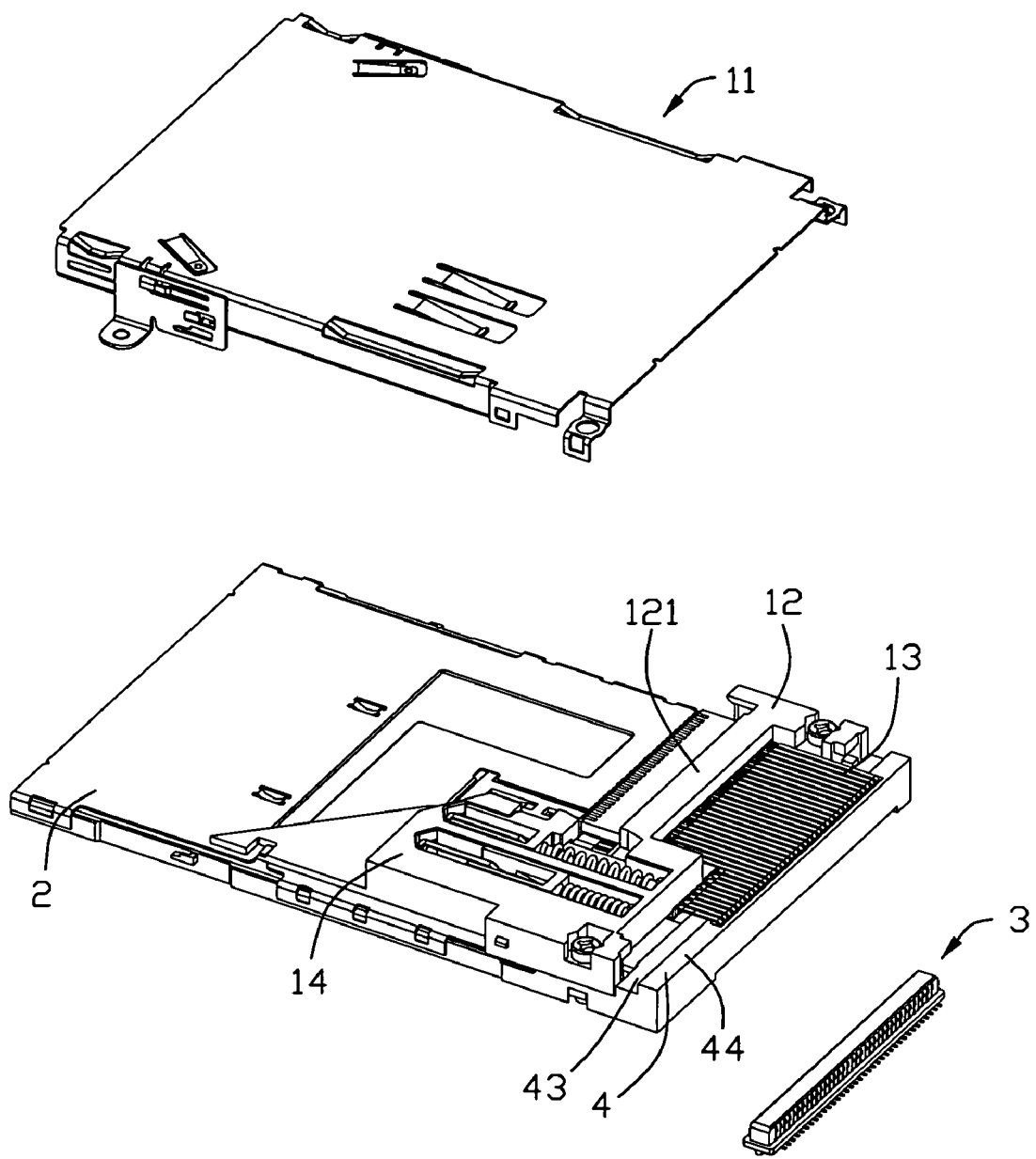
FIG. 2 is a partially exploded view of the stacked card connector of present invention as shown in FIG. 1.

Referring to FIG. 1 to FIG. 2, the first connector 1 is formed in an approximately longitudinal shape, and comprises a first shell 11 in a rectangular shape, and a first insulating housing 12 receiving a plurality of first terminals 13. The first shell 11 defining a first receiving space 10 and a first opening (not labeled) for card inserting, comprises a body plate 111 and a pair of side walls 112 extending downwardly from the body plate 111. The first insulating housing 12 comprises longitudinal base 121 and a base seat 14 extending from an end of the base 121. The first shell 11 connecting with the base 121 of the first insulating housing 12 opposite to the opening. The base seat 14 comprises a triangular guiding block (not labeled). The first terminals 13 partially received in the base 121, comprises a horizontal portion 131 and a vertical portion 132 extending downwardly from an end of the horizontal portion 131. The horizontal portion 131 is retained in the base 121 of the first insulating housing 12.

The second connector 2 comprises a second insulating housing 23, a second shell 21 covering on the second insulating housing 22 and a plurality of second terminals 23 received in the second insulating housing 22. The second shell 21 defines a second receiving space 20 adaptor for receiving a second card. Each second terminal 23 comprises a contacting portion (not labeled), a vertical tail portion 232 beyond the second insulating housing 22 and a horizontally portion 231 connecting the contacting portion and the tail portion 232. The tail portion 232 vertically extends from an end of the connecting portion 231. The vertical portions 132 of the first terminals 13 and the tail portions 232 of the second terminals are arranged in a line in a lateral direction.

Figure 3:
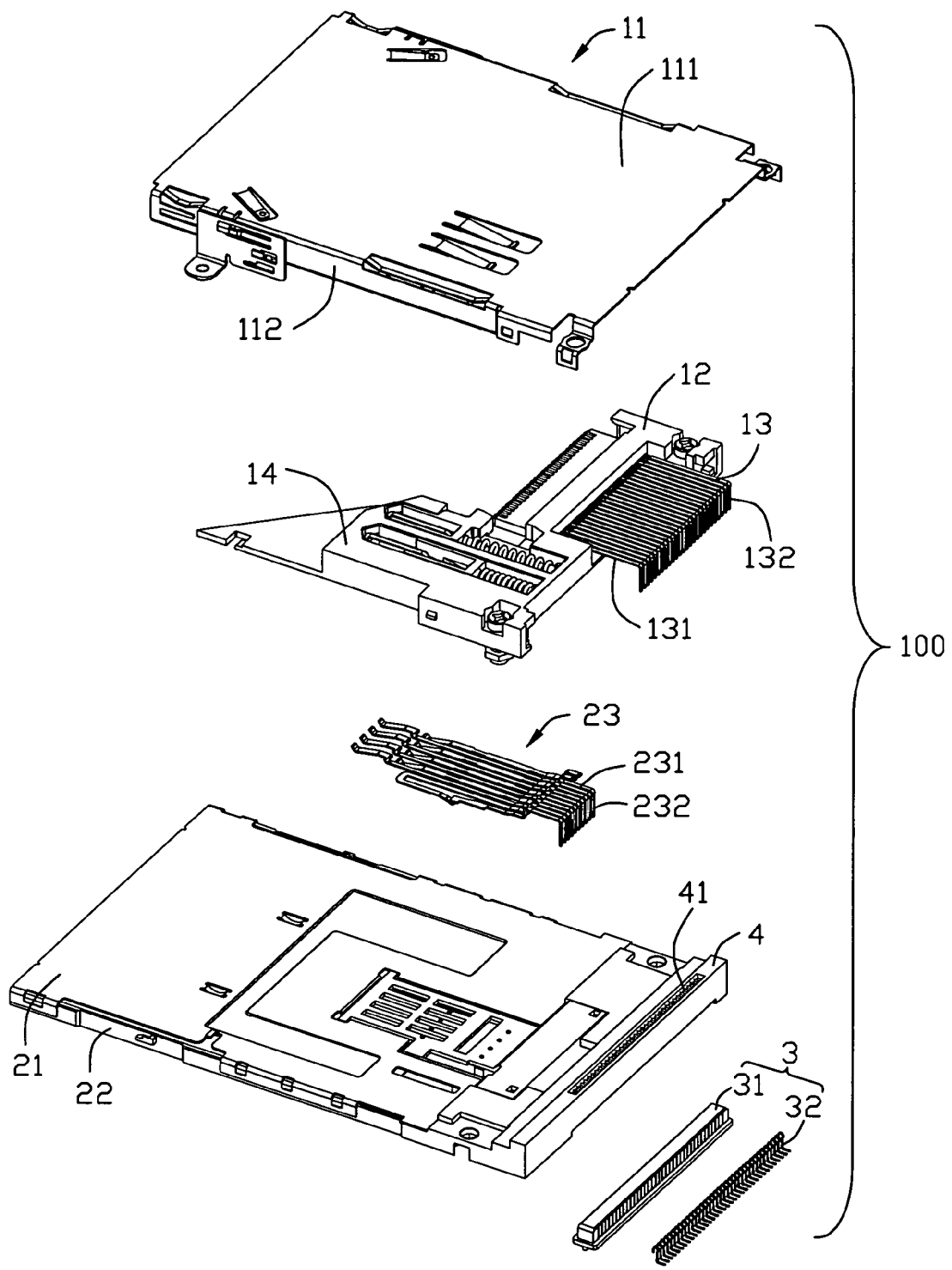
FIG. 3 is an exploded view of the stacked card connector of present invention as shown in FIG. 1.
Figure 4:
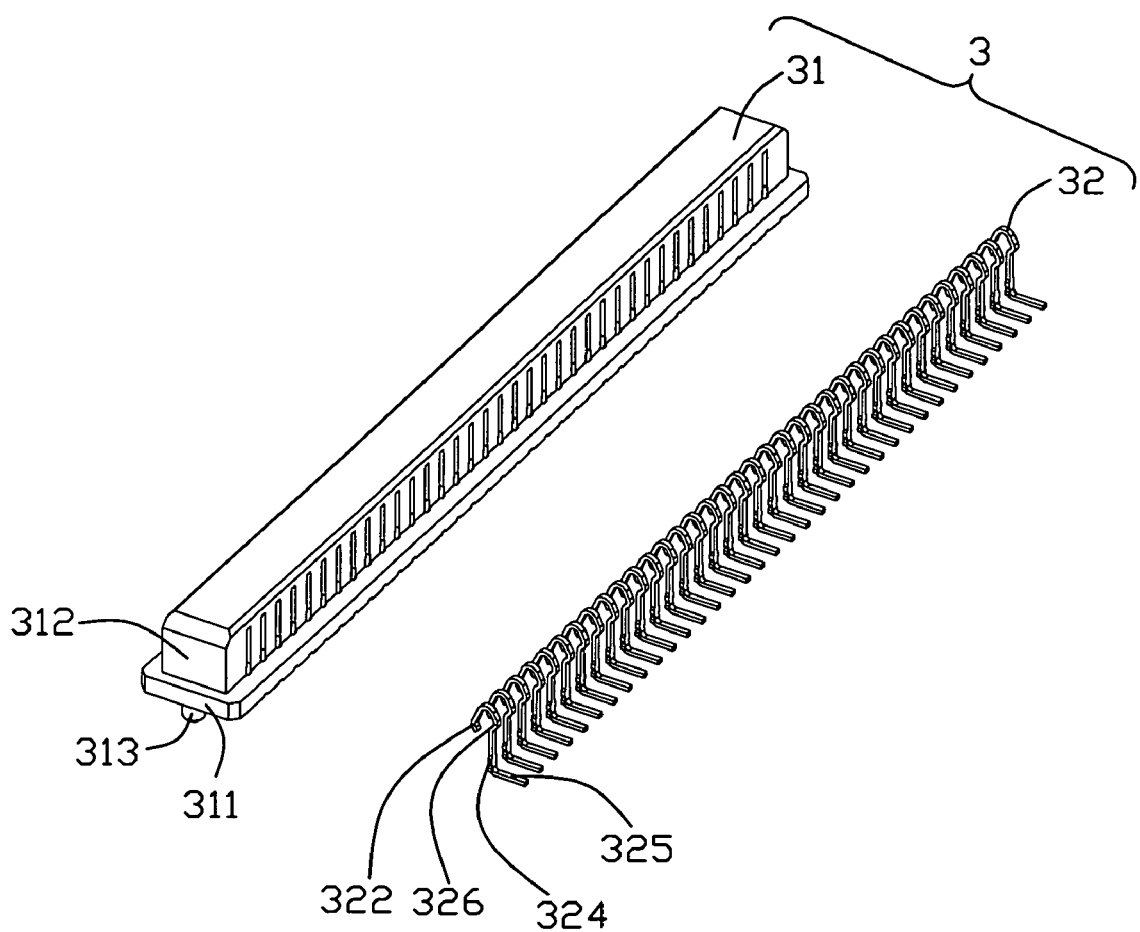
FIG. 4 is an exploded view of a converting plate of the stacked card connector of present invention as shown in FIG. 1.
Figure 5:
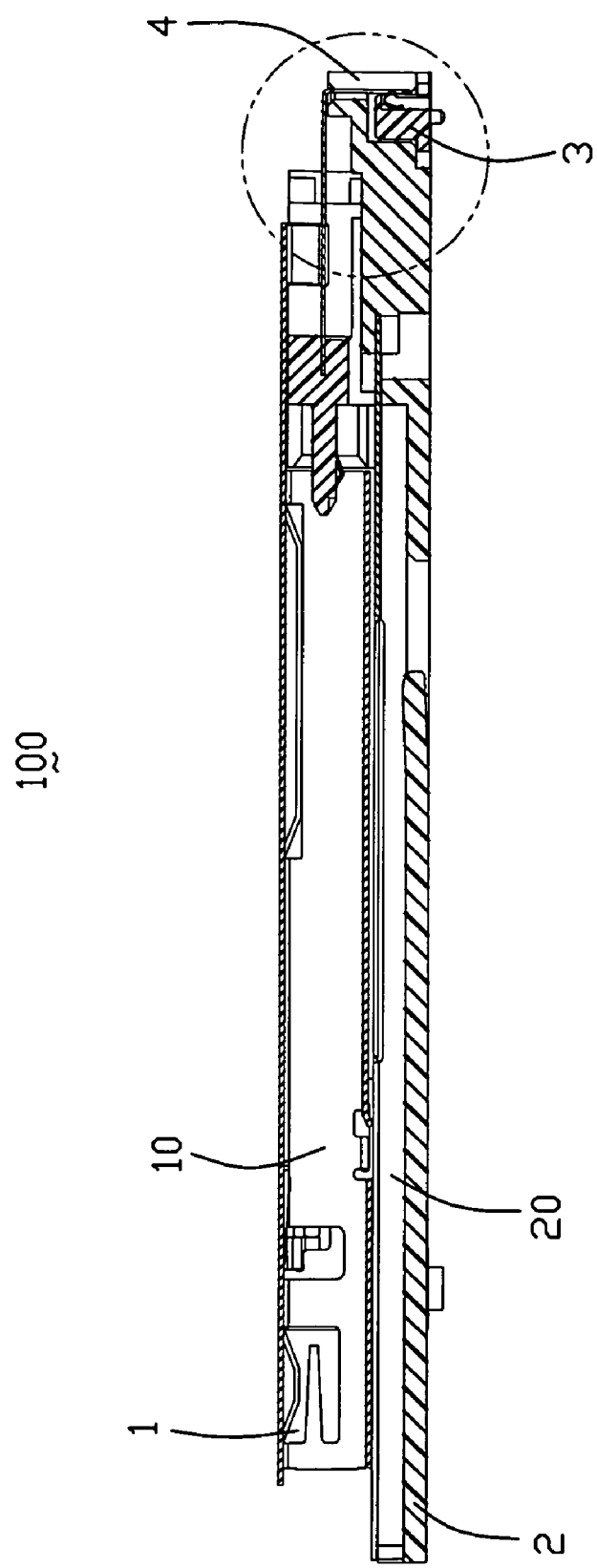
FIG. 5 is a cross-section of the stacked card connector of present invention as shown in FIG. 1.
Figure 6:
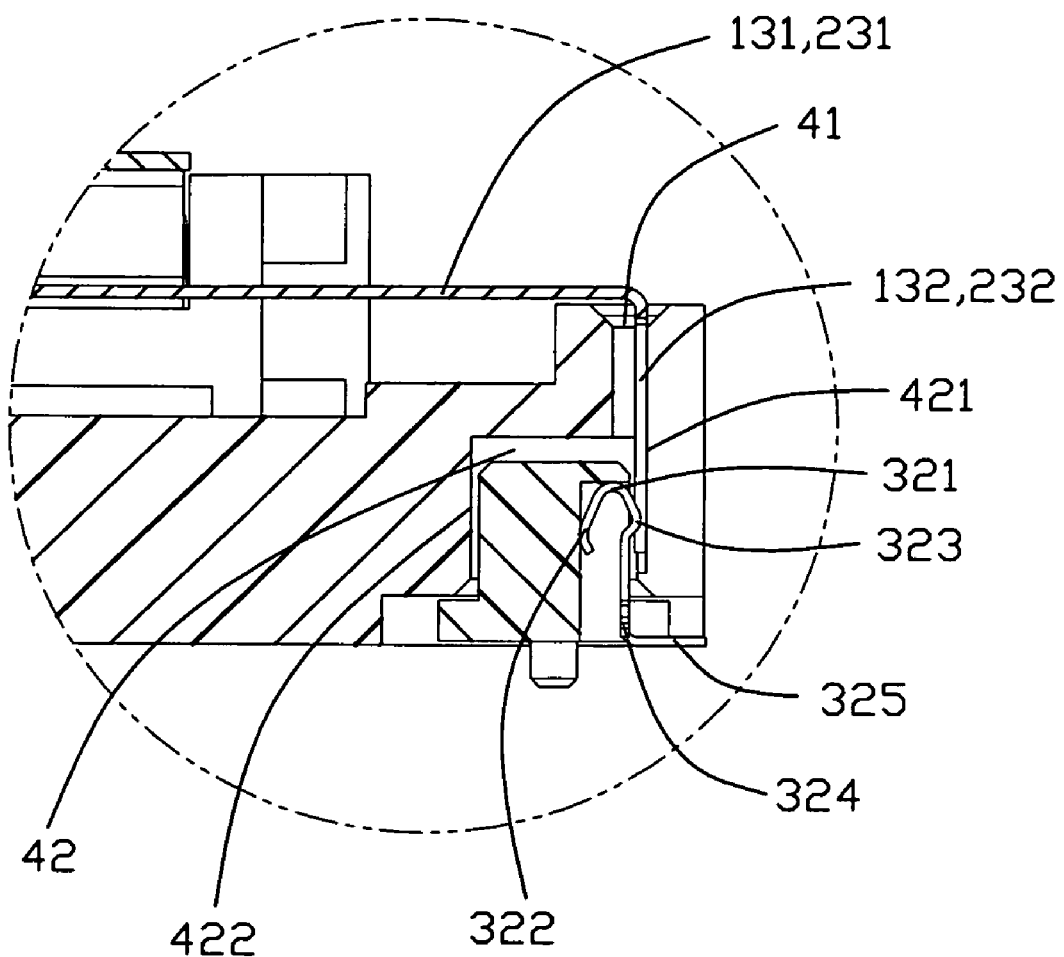
FIG. 6 is an enlarged view of the part labeled in FIG. 5.

As shown in FIG. 2, FIG. 3 and FIG. 6, the second insulating housing 22 forms a retaining member 4 at an end thereof. The retaining member 4 defines a plurality of vertical slots 41 arranged in a line in the lateral direction. The retaining member 4 further comprises a receiving cavity 42 communicating with the vertical slots 41. The vertical slots 41 are provided for corresponding first terminals 13 and the second terminals 23 passing through. The converting plate 3 is received in the receiving cavity 43. The retaining member 4 comprises a front inside surface 421 communicating with the vertical slots 41 and a rear inside surface 422. The vertical portion 132 of the first terminal 13 and the tail portion 232 of the second terminal 23 pass through the vertical slot 41 to attach the front inside surface 421. The retaining member 4 is integral with the second insulating housing 22.

Referring to FIG. 3-FIG. 6, the longitudinal converting plate 3 comprises a longitudinal body 31, a plurality of third terminals 32. The body 31 comprises a main portion 311, a receiving portion 312 extending upwardly from the main portion 311 and a positioning portion 313 extending downwardly from the main portion 311 to positioning the converting plate 3 on a printed circuit board (PCB). The receiving portion 312 defines a plurality of terminal cavities 314 at a lateral side thereof for receiving the third terminals 32. Each terminal cavity 314 defines a vertical cutout at the lateral surface of the receiving portion 312. Each third terminal 32 comprises a vertically extending retaining part 323, a resilient and curved contacting part 326 bent from the top end of the retaining part 323, a soldering part 325 extending horizontally from the bottom end of the retaining part 323. Each curved contacting part 326 forms free end 322. The third terminals 32 are assembled into corresponding terminal cavities 314 in an up-to-down direction. The retaining parts 323 are retained in the terminal cavities 314, the free ends 322 of the contacting parts 326 are received in the terminal cavities 314 and face to the inside of the terminal cavities 314, the contacting parts 326 are partially beyond the lateral surface of the receiving portion 312 from the cutouts and the soldering parts 325 are beyond the bottom surface of the main portion 311. The converting plate 3 mates with the retaining member 4 with the receiving portion 31 received in the receiving cavities. Correspondingly, the contacting parts 326 of the third terminals 32 electrically connecting with the vertical portion 132 of the first terminals 13 and the tail portions 232 of the second terminals 23 at the front inside surface 421 of the receiving cavity 43.

In this embodiment, the first card is a type of Express card, and the second card is a Smart card.

It is to be understood, however, that even though numerous characteristics and advantages of the present invention have been set forth in the foregoing description, together with details of the structure and function of the invention, the disclosure is illustrative only, and changes may be made in detail, especially in matters of shape, size, and arrangement of parts within the principles of the invention to the full extent indicated by the broad general meaning of the terms in which the appended claims are expressed.

I claim:

1. A stacked connector assembly comprising:
    a first connector and a second connector stacked upon the first connector;
    said first connector including a first insulative housing cooperating with a first shell to define a first card receiving cavity for receiving a first card;
    said second connector including a second insulative housing cooperating with a second shell to define a second card receiving cavity for receiving a second card;
    a plurality of first contacts disposed in the first housing and extending into the first receiving cavity;
    a plurality of second contacts disposed in the second housing and extending into the second receiving cavity;
    a retainer member unitarily formed with said first housing and further defining a plurality of passageways in a vertical direction to circumferentially retainably hold vertical tails of the first and the second contacts;
    further comprising a converting plate having a third insulative housing and a plurality of third contacts retained in the third insulative housing; wherein
    no horizontal passageways are unitarily formed in said first housing to circumferentially hold the corresponding first contacts; wherein
    said retainer member further defines a downward receiving cavity receiving the converting plate to mechanically and electrically engage the third contacts with the corresponding tails of the first and the second contacts.

2. The stacked connector assembly as claimed in claim 1, wherein the tails of both said first contacts and said second contacts are received in said retainer member and engaged with the corresponding third contacts, respectively.

3. The stacked connector assembly as claimed in claim 1, wherein said retainer member is unitarily formed with the first housing.

4. The stacked connector assembly as claimed in claim 1, wherein the passageways extending in the vertical direction, are aligned with one another in a lengthwise direction perpendicular to said vertical direction and a front-to-back direction.

5. The stacked connector assembly as claimed in claim 2, wherein both first contacts and the second contacts include horizontal sections linked to the corresponding vertical tails before entering the corresponding passageways of the retainer member.

6. The stacked connector assembly as claimed in claim 5, wherein said horizontal sections of both said first contacts and said second contacts are located at a same horizontal plane.

7. A stacked connector assembly comprising:
    a first connector and a second connector stacked upon the first connector;
    said first connector including a first insulative housing cooperating with a first shell to define a first card receiving cavity for receiving a first card;
    said second connector including a second insulative housing cooperating with a second shell to define a second card receiving cavity for receiving a second card;
    a plurality of first contacts disposed in the first housing and extending into the first receiving cavity;
    a plurality of second contacts disposed in the second housing and extending into the second receiving cavity, each of said second contacts defines a reverse L-shaped tail at a rear end thereof;
    a retainer member defining an upper portion on which a horizontal section of the tail of each second contacts is seated, and a plurality of passageways each to retainably hold a vertical section of the tail of each second contact, said retainer member further defining a downward receiving cavity; and
    a converting plate received in the downward receiving cavity of the retainer member, said converting plate including a plurality of third contacts therein to mechanically and electrically engage the vertical sections of the tails of the corresponding second contacts, respectively, under a condition that contacting parts of the third contacts and the horizontal sections of the tails are located on a same side of the corresponding vertical sections, respectively; wherein
    said retainer member is unitarily formed with the first housing, while said first contacts are not circumferentially received respectively in any passageways which extend in a horizontally direction and are unitarily formed within the first housing.

* * * * *